United States Patent
Ichikawa et al.

(10) Patent No.: US 8,942,544 B2
(45) Date of Patent: Jan. 27, 2015

(54) SELECTIVE TRANSMISSION OF MOTION PICTURE FILES

(75) Inventors: Shigeru Ichikawa, Tokyo (JP); Masachika Sasaki, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/557,759

(22) Filed: Jul. 25, 2012

(65) Prior Publication Data

US 2013/0034341 A1 Feb. 7, 2013

(30) Foreign Application Priority Data

Aug. 3, 2011 (JP) ................................. 2011-170147

(51) Int. Cl.
- *H04N 5/783* (2006.01)
- *G11B 27/034* (2006.01)
- *G11B 27/34* (2006.01)

(52) U.S. Cl.
CPC .............. *G11B 27/034* (2013.01); *G11B 27/34* (2013.01)
USPC .......................................... 386/282; 715/748

(58) Field of Classification Search
USPC ............................ 386/231; 715/723, 726, 748
See application file for complete search history.

(56) References Cited

U.S. PATENT DOCUMENTS

| | | | |
|---|---|---|---|
| 7,592,532 B2 * | 9/2009 | Coleman | 84/603 |
| 8,108,403 B2 * | 1/2012 | Gopalraj et al. | 707/748 |
| 2007/0189708 A1 * | 8/2007 | Lerman et al. | 386/52 |
| 2009/0164606 A1 * | 6/2009 | Epifania et al. | 709/219 |
| 2010/0158109 A1 * | 6/2010 | Dahlby et al. | 375/240.03 |
| 2010/0205279 A1 * | 8/2010 | Takakura | 709/219 |
| 2011/0055721 A1 * | 3/2011 | Jain et al. | 715/748 |
| 2011/0107234 A1 * | 5/2011 | Lee et al. | 715/748 |
| 2011/0138301 A1 * | 6/2011 | Hirako | 715/751 |
| 2011/0167462 A1 * | 7/2011 | O'Connor et al. | 725/110 |
| 2012/0045188 A1 | 2/2012 | Sasaki et al. | |

FOREIGN PATENT DOCUMENTS

| | | |
|---|---|---|
| JP | 2004-104468 A | 4/2004 |
| JP | 2012-043207 A | 3/2012 |

* cited by examiner

*Primary Examiner* — David Harvey
(74) *Attorney, Agent, or Firm* — Lerner, David, Littenberg, Krumholz & Mentlik, LLP

(57) ABSTRACT

Provided is an information processing apparatus including a storage part for storing criteria information of a plurality of destinations, and a display control part for performing control to display transmission capability information indicating whether it is possible to transmit, to each of the destinations, a selected motion picture file in a predetermined range selected from a motion picture file by a user, the transmission capability information being derived based on information about the selected motion picture file and the criteria information.

5 Claims, 14 Drawing Sheets

| SERVICE NAME | LIMIT TIME | LIMIT CAPACITY |
|---|---|---|
| SERVICE 1 | 30 MINUTES | 100MB |
| SERVICE 2 | NONE | 10MB |
| SERVICE 3 | 10 MINUTES | NONE |
| ⋮ | ⋮ | ⋮ |

FIG. 9

| ☑ ServiceA | MAXIMUM FILE SIZE | 2048MB |
| | MAXIMUM DURATION | 900sec |

| ☑ ServiceB | MAXIMUM FILE SIZE | 100MB |
| | MAXIMUM DURATION | 120sec |

☑ ServiceC

☐ ServiceD

Service Name

ServiceA

Max Size

30    MB

Max Duration

1800    Sec

BOX STRUCTURE

A:WHOLE SIZE OF A + B + C
B:NAME OF BOX STRUCTURE
C:DATA BODY

SELECTING RANGE OF MOTION PICTURE LOCATES BOX STRUCTURE, AND THUMBNAIL IMAGES B TO D ARE MADE SELECTED RANGE.

FIG. 18

| SERVICE NAME | LIMIT TIME | LIMIT CAPACITY | FORMAT | BIT RATE |
|---|---|---|---|---|
| SERVICE 1 | 30 MINUTES | 100MB | MP4/AVC | 3Mbps |
| SERVICE 2 | NONE | 10MB | MP4/MPEG4 | 5Mbps |
| SERVICE 3 | 10 MINUTES | NONE | AVCHD | 7Mbps |
| ⋮ | ⋮ | ⋮ | ⋮ | ⋮ |

SELECTIVE TRANSMISSION OF MOTION PICTURE FILES

CROSS-REFERENCE TO RELATED APPLICATION

The present application claims priority from Japanese Patent Application No. JP 2011-170147 filed in the Japanese Patent Office on Aug. 3, 2011, the entire content of which is incorporated herein by reference.

The present disclosure relates to an information processing apparatus and a display method.

BACKGROUND

The present disclosure relates to an information processing apparatus and a display method.

In the past, for example, in Japanese Patent Application Laid-Open No. 2004-104468, the description about a slide bar and an indicator has been provided when the length of a motion picture is edited to a predetermined length for transmitting the motion picture to a mobile terminal. The slide bar sets the position and the length of the motion picture and the indicator indicates the position to be displayed in the selected range.

SUMMARY

When the motion picture is edited and uploaded to a network service for sharing the motion picture or transmitted via an e-mail, the network service and the e-mail sometimes have the capacity limit or the duration limit. Accordingly, sometimes the taken motion picture is not readily transmitted via an e-mail or uploaded without change. Japanese Patent Application Laid-Open No. 2004-104468 describes a configuration for displaying a maximum transmittable duration in the case where the duration of the file to be edited is less than a predetermined time. However, Japanese Patent Application Laid-Open No. 2004-104468 does not assume the convenience in the case where the file is uploaded on, for example, a plurality of online services that has a limit on the upload condition (length, capacity or the like).

In light of the foregoing, when the user, for example, edits a motion picture file, it is desirable that the user can determine in real time whether a plurality of services is available.

According to an embodiment of the present disclosure, there is provided an information processing apparatus including: a storage part for storing criteria information of a plurality of destinations; and a display control part for performing control to display transmission capability information indicating whether it is possible to transmit, to each of the destinations, a selected motion picture file in a predetermined range selected from a motion picture file by a user, the transmission capability information being derived based on information about the selected motion picture file and the criteria information.

According to another embodiment of the present disclosure, there is provided a display method including: storing criteria information of a plurality of destinations; and performing control to display transmission capability information indicating whether it is possible to transmit, to each of the destinations, a selected motion picture file in a predetermined range selected from a motion picture file by a user, the transmission capability information being derived based on information about the selected motion picture file and the criteria information.

According to an embodiment of the present disclosure, when the user, for example, edits a motion picture file, the user can determine in real time whether a plurality of services is available.

BRIEF DESCRIPTION OF THE DRAWINGS

FIG. 9 is a schematic view of the screen for registering service names that are displayed on a service availability display region 29 and the criteria information for the service availability;

FIG. 10 is a schematic view of the screen for changing the registration of the criteria information;

FIG. 18 is a schematic view of another reference chart of the set values of each service.

DETAILED DESCRIPTION OF THE EMBODIMENTS

Figure 1:
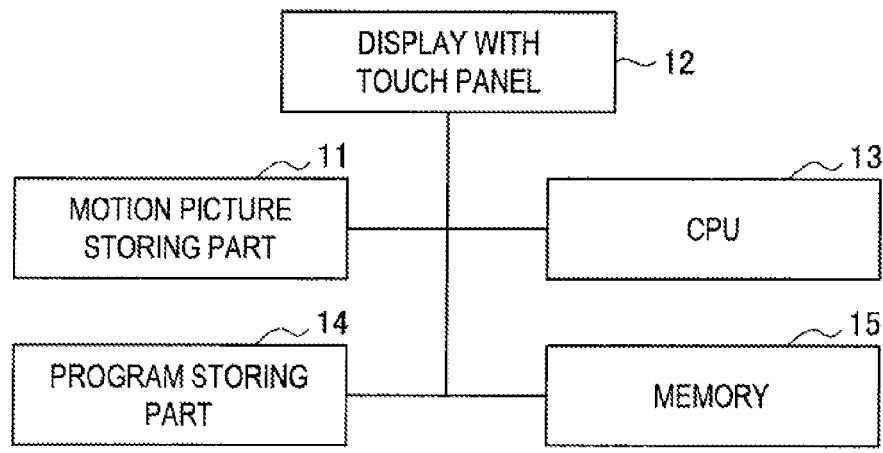
FIG. 1 is a block diagram of the configuration of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be done in the following order.

1. Exemplary Configuration of Information Processing Apparatus
2. Structure of Frame-selection Screen
3. Method for Specifying Range in Motion Picture File 4. Process in Information Processing Apparatus
5. Setting for Criteria Information
6. Exemplary MP4 File Format

[1. Exemplary Configuration of Information Processing Apparatus]

The present embodiment relates to an information processing apparatus that specifies/selects (clips) the desired range from a motion picture to generate a motion picture file. Examples of types of products including the information processing apparatus according to the present embodiment can include a portable terminal such as a smartphone, or a personal digital assistant (PDA). The information processing apparatus according to the present disclosure, of course, is not limited to the types of products.

FIG. 1 is a block diagram of the configuration of an information processing apparatus according to an embodiment of the present disclosure. As shown in FIG. 1, an information processing apparatus 100 includes a motion picture storing part 11, a display with touch panel 12 (detecting part and display part), a CPU 13 (control part), a program storing part 14, a memory 15 and the like.

The motion picture storing part 11 is configured to store motion picture data that have been compressed and encoded, for example, by inter-frame prediction. More specifically, the motion picture storing part 11 is a high-capacity rewritable storing device such as a memory card, a solid state drive (SSD), or a hard disc drive (HDD).

The display with touch panel 12 includes, for example, a display panel and a touch panel provided on the display panel. Examples of the display panel include a panel-type display such as a liquid crystal display, or an organic electro-luminescence (EL) display. Examples of the touch panel include a capacitance type touch panel, and a resistive touch panel. The touch panel processes the input for operation by the user to a graphical user interface (GUI) displayed on the display panel. In other words, the touch panel sequentially detects the positions on the GUI screen touched or approached by the user's finger, and supplies a series of information about the positions to the CPU 13.

The central processing unit (CPU) 13 controls the whole of the information processing apparatus 100. For example, the CPU 13 can perform, for example, the following processes according to a program stored in the program storing part 14.

1. Process for displaying information about a selected motion picture file and transmission capability information indicating whether the selected motion picture file can be transmitted to a plurality of destinations. The selected motion picture file is a predetermined range selected from a motion picture file by the user. The destinations have been led based on the criteria information.

2. Process for clipping the predetermined range selected from the motion picture file by the user to generate a selected motion picture file.

3. Process for displaying, together with the transmission capability information, a menu for clipping the selected motion picture file from the motion picture file.

4. Process for transmitting the generated selected motion picture file to each service through a network or the like.

5. Process for transmitting the generated selected motion picture file without re-encoding.

6. Process for receiving the input for operation to set the criteria.

Furthermore, the CPU 13 can perform, for example, the following processes according to a program stored in the program storing part 14.

7. Process for decoding the motion picture data to generate a thumbnail image in order to display the GUI including a plurality of thumbnail images on the frame-selection screen or the like.

8. Process for determining, based on the information from the touch panel, the input for operation by the user to the GUI on the frame-selection screen or the like.

9. Process for shifting, according to the determined input for operation, the range of the thumbnail images in the motion picture (thumbnail display range) that is to be displayed on the frame-selection screen.

10. Process for changing, according to the determined input for operation, frame intervals of the thumbnail images to be displayed on the frame-selection screen.

11. Process for storing, according to the determined input for operation, a still picture of the frame corresponding to the thumbnail image selected by the user.

The memory 15 is used as a working space for each of the above-mentioned processes performed by the CPU 13. The memory 15 also stores the criteria information described below.

Note that, although FIG. 1 shows the structure when the CPU 13 decodes the motion picture data, dedicated hardware (a decoder) also can decode the motion picture data.

[2. Structure of Frame-Selection Screen]

Figure 2:
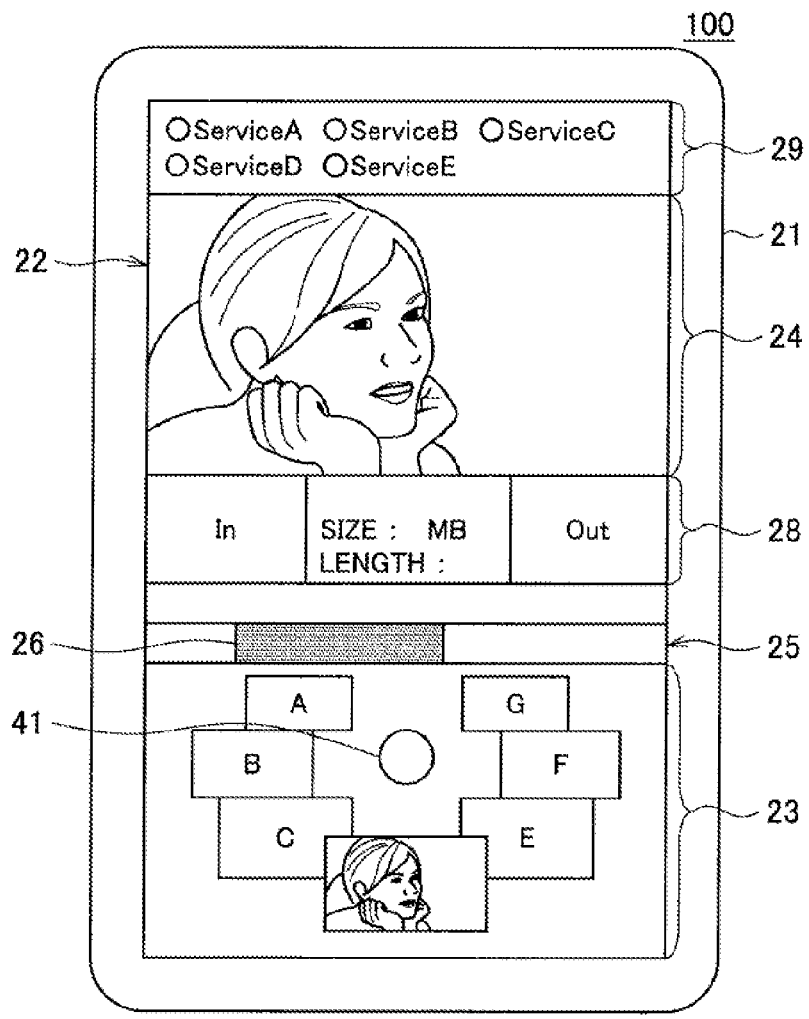
FIG. 2 is an elevation view including a frame-selection screen of the information processing apparatus according to the embodiment.

FIG. 2 is an elevation view including a frame-selection screen of the information processing apparatus 100 according to the present embodiment.

Reference numeral 21 denotes a chassis of the information processing apparatus 100 in FIG. 2. Each part shown in FIG. 1 is contained in the chassis. Reference numeral 22 denotes a screen of the display with touch panel 12. A touch panel is provided relative to the screen 22.

The frame-selection screen is a GUI screen for causing the user to find and select an image of a frame to be stored as a still picture from the motion picture. The frame-selection screen includes a thumbnail display region 23 placed at the lower side, a candidate frame display region 24 placed on the upper side, a service availability display region 29 placed on the top, a gauge region 25 placed between the thumbnail display region 23 and the candidate frame display region 24, and a selection result display region 28.

The thumbnail display region 23 displays, in a circular pattern and in sequence, a plurality of thumbnail images A, B, . . . , G corresponding to a plurality of frames in at lease a part of time range of the motion picture. A control handler 41 is placed at the center of the thumbnail images A, B, . . . , G. The control handler 41 is used for the "shift operation of the thumbnail display range" and the "change operation of the set frame interval" described below. Note that the thumbnail images can be placed not only in a circle but also in a V-formation or a U-formation.

Although the number of thumbnail images displayed at the thumbnail display region 23 can be fixed or changeable, the number is fixed in the present embodiment. Each of the frames displayed as the thumbnail images is included in a part of range of the motion picture. The part of range is divided into N gatherings of frames. Hereinafter, the range is referred to as "thumbnail display range". The frames displayed as the thumbnail images have the same intervals in the thumbnail display range. Hereinafter, the interval is referred to as "set frame interval".

The thumbnail display range can be shifted on the time axis by the "shift operation of the thumbnail display range". The length of the thumbnail display range (the number of frames=N) can be changed by the "change operation of the set frame interval". The CPU 13 in the information processing apparatus 100 determines which operation is to be performed, the "shift operation of the thumbnail display range" or the "change operation of the set frame interval", according to a program stored in the program storing part 14 and based on the position detected by the touch panel. According to the determined operation, the CPU 13 controls the information processing apparatus to shift the thumbnail display range or to change the set frame intervals in order to change the length of the thumbnail display range. As described above, the thumbnail display range is shifted and the length of the thumbnail display range is changed so that the user can look over the whole of the motion picture data on various time scales. This can clip a desired part from the whole of the motion picture data to create a desired selected motion picture file as described in detail below.

In the present embodiment, a predetermined number of thumbnail images (seven thumbnail images A, B, . . . , G in the present embodiment) are displayed in a circular pattern on the frame-selection screen as shown in FIG. 2. In this case, the thumbnail image G placed on the upper right corresponds to the latest frame on the time axis among the seven thumbnail images A, B, . . . , G included in the thumbnail display range. The thumbnail image A placed on the upper left corresponds to the frame nearest the start point on the time axis among the seven thumbnail images A, B, . . . , G included in the thumbnail display range. The thumbnail image D placed at the midpoint of right and left and at the bottom corresponds to the middle frame on the time axis among the seven thumbnail images A, B, . . . , G included in the thumbnail display range. The image of the middle frame is simultaneously displayed on the candidate frame display region 24. Then the image of the frame displayed on the candidate frame display region 24 is specified as the start point or the end point by the user's input for operation.

Figure 3:
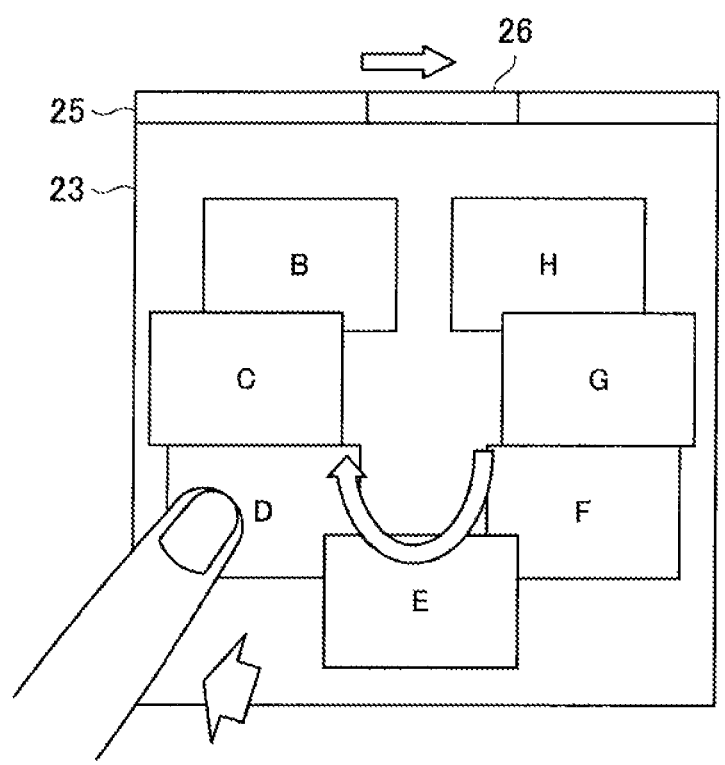
FIG. 3 is a schematic view of an operation for swiping a screen in a clockwise direction along the circular pattern of a plurality of thumbnail images.

Next, the "shift operation of the thumbnail display range" will be described. In the present embodiment, the input for operating the touch panel can bi-directionally shift the thumbnail display range in a direction where the time is advanced and a direction where the time is turned back. The input is performed on the thumbnail display region 23 on the frame-selection screen shown in FIG. 2. For example, it is assumed that the thumbnail images are displayed to correspond to seven frames in a motion picture having 500 frames. The middle frame of the seven frames is the 200th frame. The others of the seven frames are placed, three and three, before and after the middle frame at 16-frame intervals. It is assumed that, from this point, the user swipes the screen in a clockwise direction along the circular pattern of a plurality of thumbnail images as shown in FIG. 3. The CPU 13 determines the swipe operation, and shifts the thumbnail display range by the set frame interval (16 frames) in the direction where the time is advanced. Accordingly, the thumbnail image A disappears, the thumbnail images B, C, D, E, F and G are shifted one by one in the clockwise direction, and a thumbnail image H newly appears on the thumbnail display region 23. The thumbnail image A corresponds to the frame nearest the start point (the frame number=152) in the thumbnail display range. The thumbnail images B, C, D, E, F and G correspond to the frames having the frame numbers 168, 184, 200, 216, 232, and 248, respectively. The thumbnail image H corresponds to the frame nearest the end point (the frame number=264) in the shifted thumbnail display range. The CPU 13 also shifts the position of a gauge 26 to the right side in the gauge region according to the shift of the thumbnail display range. Thus, the user can shift "the thumbnail display range" to the start point side of the motion picture. The thumbnail display range is displayed on the thumbnail display region 23 from the whole of the motion picture data.

In the same manner, when the user swipes the screen in a counterclockwise direction along the circular pattern of the thumbnail images, "the thumbnail display range" displayed on the thumbnail display region 23 is shifted to the end point side of the motion picture.

The gauge 26 is displayed at the upper side of the thumbnail display region 23, and shows the position of "the thumbnail display range" in the whole of the motion picture data. Accordingly, the user can determine, by checking the position of the gauge 26, where "the thumbnail display range" is positioned in the whole of the motion picture data. The thumbnail display range is shown with the seven thumbnail images displayed on the thumbnail display region 23.

Note that the "shift operation of the thumbnail display range" can also be done by operating the control handler 41 placed at the center of the thumbnail images. When the user performs the input for operation to slide the control handler 41 to the right, the CPU 13 determines the operation and shifts the thumbnail display range by the set frame interval in the direction where the time is advanced. As a result, the display of the thumbnail images A to G is updated to the display of the thumbnail images B to H. Then, "the thumbnail display range" displayed on the thumbnail display region 23 is shifted to the start point side of the motion picture. In the same manner, when the user performs the input for operation to slide the control handler 41 to the left side, "the thumbnail display range" displayed on the thumbnail display region 23 is shifted to the end point side of the motion picture.

Next, the "change operation of the set frame interval" will be described. In the information processing apparatus 100 according to the present embodiment, sliding the control handler 41 up and down can change the set frame interval denoting the time interval between the frames of the displayed thumbnail images. The control handler 41 is displayed at the center of the arrangement of the thumbnail images. When the maximum number of the frames displayed as the thumbnail images is fixed, the enlargement of the set frame interval displaying the thumbnail images consequently enlarges the thumbnail display range, and, on the other hand, the reduction of the set frame interval consequently reduces, in the motion picture, the time range of the frames displayed as the thumbnail images.

For example, it is assumed in the state shown in FIG. 2 that the seven thumbnail images are displayed to correspond to seven frames in a motion picture having 500 frames, respectively. The 200th frame is selected as the middle frame of the seven frames. The other six frames of the seven frames are selected, three and three, before and after the middle frame at 16-frame intervals. When the user performs the input for operation to downwardly slide the control handler 41 from this point, the CPU 13 determines the operation and enlarges the set frame interval to change, for example, 16 frames to 32 frames. In other words, the length of the thumbnail display range is also doubled. This updates the display. Then seven thumbnail images corresponding to seven frames are displayed. The middle frame of the seven frames is the 200th frame. The other six frames of the seven frames are selected, three and three, before and after the middle frame at 32-frame intervals. At the same time, the CPU enlarges the width of the gauge 26 at a magnification according to the set frame interval while the center of the gauge 26 is fixed relative to the gauge region 25.

In contrast, when the user performs the input for operation to upwardly slide the control handler 41 and the operation is for reducing the set frame interval, the CPU 13 changes, for example, the 16 frames in half to 8 frames. In other words, the length of the thumbnail display range is halved. This updates the display. Then seven thumbnail images corresponding to seven frames are displayed. The middle frame of the seven frames is the 200th frame. The other six frames of the seven frames are selected, three and three, before and after the middle frame at 8-frame intervals. At the same time, the CPU 13 reduces the width of the gauge 26 at a reduction ratio according to the set frame interval while the center of the gauge 26 is fixed relative to the gauge region 25. As described above, the width of the gauge 26 is enlarged/reduced in the gauge region 25 at a magnification/reduction ratio of the set frame interval so that the user can visually easily know that the enlargement/reduction of the length of the thumbnail display range has been completed. This can be expected to increase the operability.

As described above, the user performs both of the "shift operation of the thumbnail display range" and the "change operation of the set frame interval" so that desired thumbnail images can be displayed on the thumbnail display region 23 and a desired range can be specified and selected (clipped) from the whole of the motion picture file.

[3. Method for Specifying Range in Motion Picture File]

Figure 4:
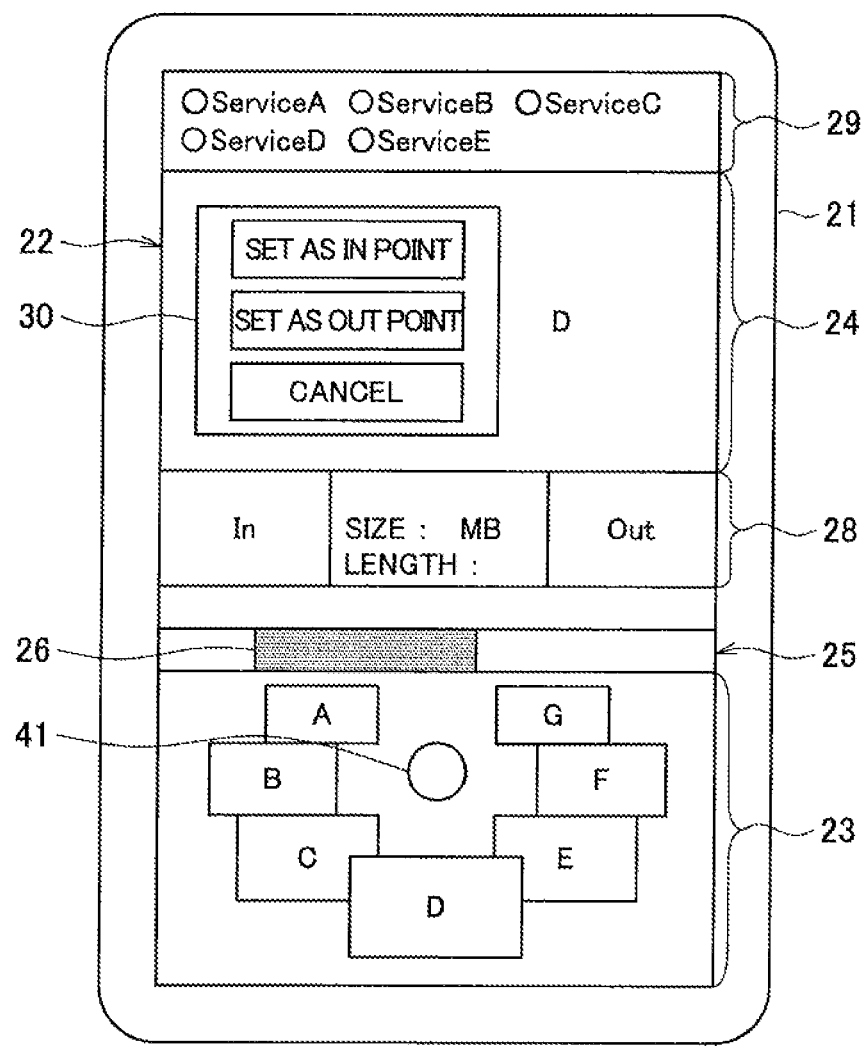
FIG. 4 is a schematic view of a display of the screen for specifying an In point and an Out point.

Next, method for specifying a range in a motion picture file according to the present embodiment will be described. As described above, the thumbnail image D is placed at the bottom of the thumbnail display region 23, and corresponds to the middle frame on the time axis in seven the thumbnail images A, B, . . . , G included in the thumbnail display range. The thumbnail image D is also displayed on the candidate frame display region 24. When the user touches the candidate frame display region 24 (namely, the thumbnail image D) while the thumbnail image D is displayed on the candidate frame display region 24 as shown in FIG. 2, a specifying screen 30 is displayed as shown in FIG. 4. Three buttons: "set as In point"; "set as Out point"; and "cancel" are displayed on the specifying screen 30. When the user touches the "set as In point" on that screen, the thumbnail image D displayed on the candidate frame display region 24 is set as the start point of the motion picture.

It is assumed that the user subsequently swipes the screen in a clockwise direction along the circular pattern of a plurality of thumbnail images on the thumbnail display region 23, and the thumbnail image G is positioned at the bottom of the thumbnail display region 23. At that time, the thumbnail image G is displayed on the candidate frame display region 24. When the user touches the candidate frame display region 24 (namely, the thumbnail image G) in that condition, the specifying screen 30 is displayed in the same manner as shown in FIG. 4. When the user touches the "set as Out point", the thumbnail image G displayed on the candidate frame display region 24 is set as the end point of the motion picture.

Accordingly, the user can set the start point of the motion picture by touching the thumbnail display region 23 and swiping the screen in order to display, on the candidate frame display region 24, a thumbnail image to be set as the In point (start point), and touching the "set as In point" on the specifying screen 30. In the same manner, the user can set the end point of the motion picture by touching the thumbnail display region 23 and swiping the screen in order to display, on the candidate frame display region 24, a thumbnail image to be set as the Out point (end point), and touching the "set as Out point" on the specifying screen 30.

Figure 5:
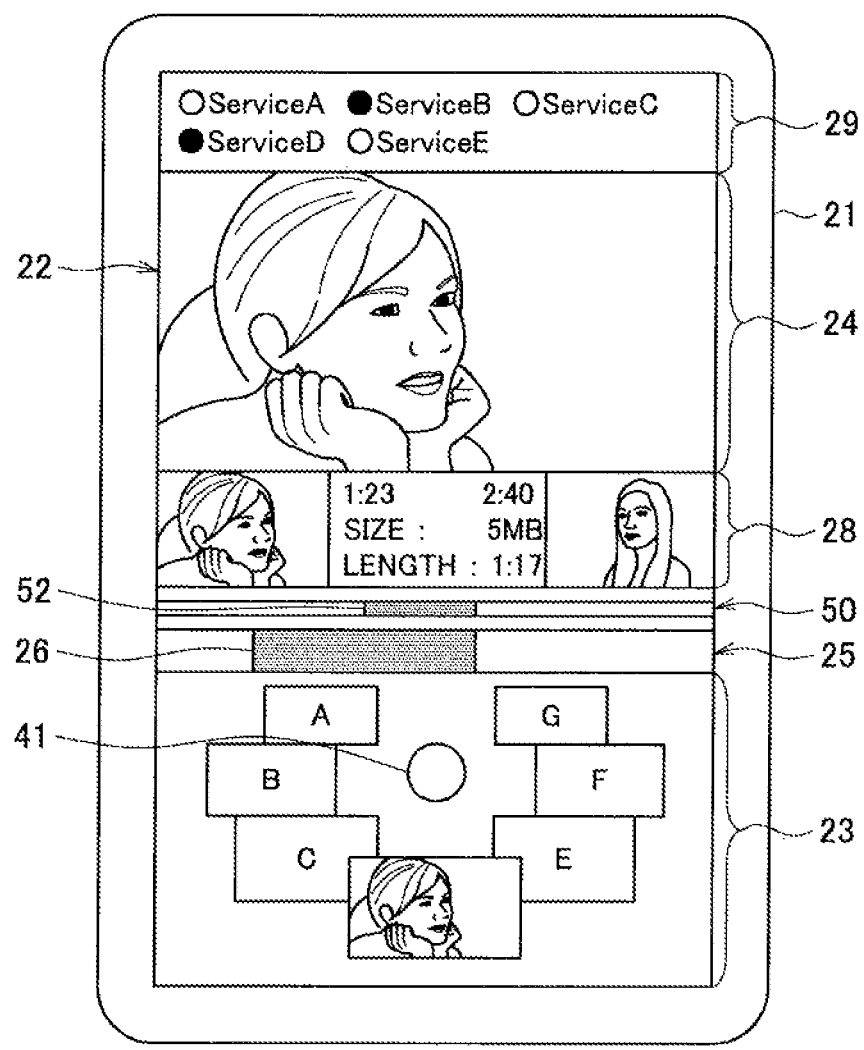
FIG. 5 is a schematic view of the screen after an In point and an Out point have been specified.

FIG. 5 is a schematic view after the user has specified the In point and the Out point. As shown in FIG. 5, after the user has set the In point and the Out point, the thumbnail image D set as the In point is displayed at the left side and the thumbnail image G set as the Out point is displayed at the right side of the selection result display region 28. Furthermore, a selected motion picture is specified with the In point and the Out point. The size and length (duration) of the selected motion picture file are calculated and displayed at the center of the selection result display region 28. Assuming that the starting time of the whole of the motion picture is set as zero, the time of the start point and the time of the end point are displayed on the size display of the motion picture file.

Furthermore, a service availability display region 29 is placed at the upper side of the screen, and displays whether the motion picture file set with the In point and the Out point is applied to each of services A to E. In this case, the services A to E include various services where the selected motion picture is uploaded thereto through a network or a service for transmitting the selected motion picture via an e-mail, for example, "YouTube", "Facebook", "Gmail", a "mail service (maximum size 2 MB)", and a "mail service (maximum size 5 MB)".

As shown in FIG. 5, "filled circles" are put on the services B and D, and indicate that the specified range of the motion picture cannot be uploaded (or transmitted via an e-mail). On the other hand, the circles of the services A, C, and E are not filled, and indicate that the specified range of the motion picture can be uploaded (or transmitted via e-mail).

Furthermore, an example showing that another gauge region 50 other than the gauge region 25 is provided in FIG. 5. The gauge 52 is displayed on the gauge region 50, and shows the position and the range of the motion picture file selected with the In point and the Out point. This enables the user to recognize from the gauge 52 where the motion picture file selected with the In point and the Out point is in "the thumbnail display range", and to recognize the range and position of the motion picture to be actually clipped and transmitted. As described above, in addition to the transmission capability information and the menu, information indicating the clipped range of the motion picture (the gauge and the gauge 52) is displayed so that the user can visually easily recognize the position and the range of the motion picture data to be actually transmitted.

For example, when the service B is "Facebook" and the size and the duration of the specified motion picture file exceed the size and the duration for a motion picture file that has been preset by "Facebook" and that can be uploaded, the "filled circle" is put on the service B as shown in FIG. 5.

As described above, according to the present embodiment, when specifying the start point and the end point of a motion picture and clipping a desired motion picture file, the user can instantly recognize, by visually recognizing the display of the service availability display region 29, whether each of the services is available for the specified motion picture file. Accordingly, if the desired service is not available, the size and the length of the motion picture file can be reset. This can certainly prevent an error occurrence which would otherwise be caused by, for example, the upload of the specified motion picture file for which the service is not available. The display of the service availability display region 29 is displayed in real time while the user specifies the selected motion picture file so that the user can recognize in real time whether the services are available for the specified selected motion picture file. Thus, when the service is not available, the motion picture can be specified again.

[4. Process in Information Processing Apparatus]

Figure 6:
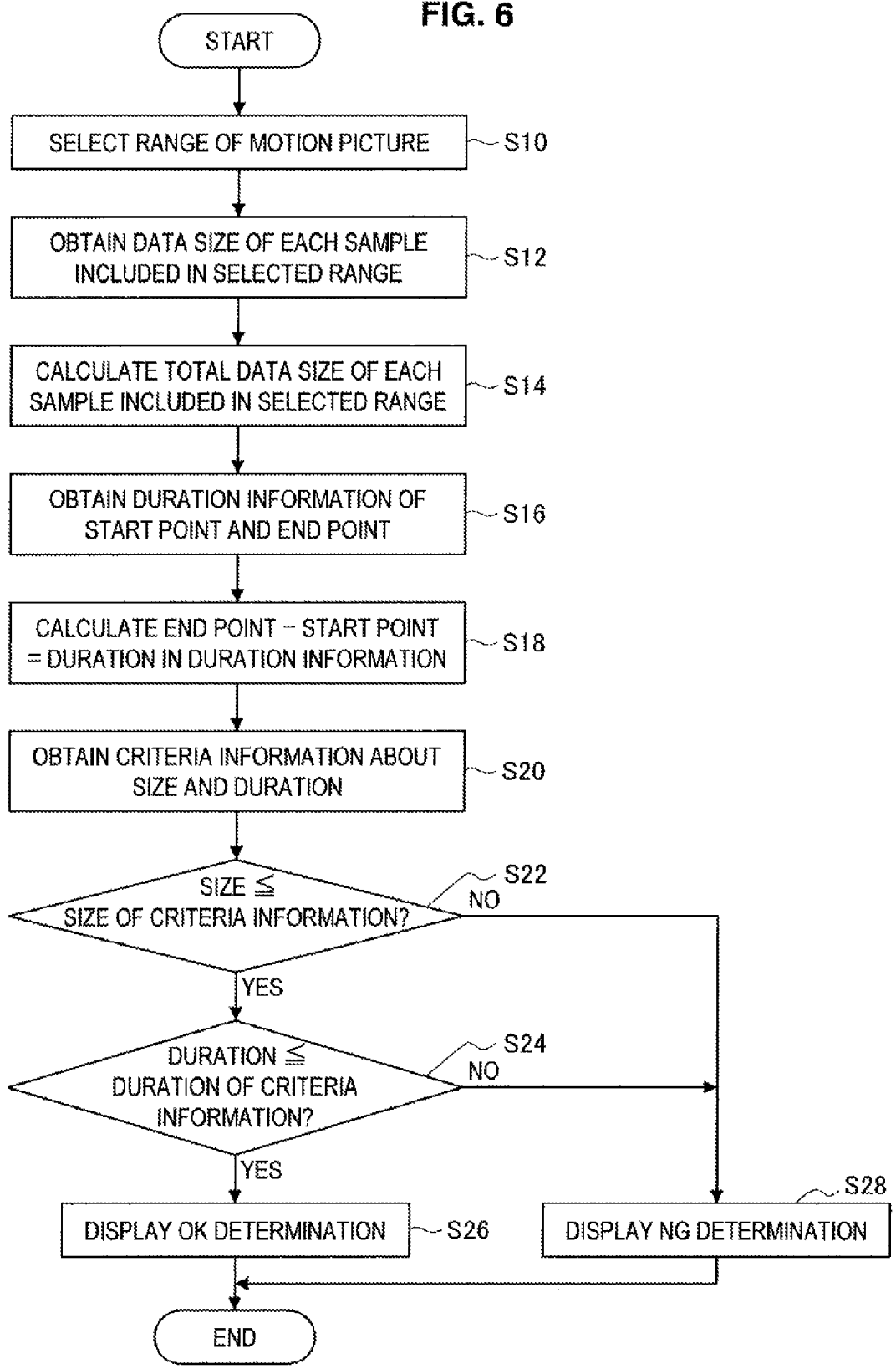
FIG. 6 is a flowchart of a process in the present embodiment.

Next, a process in the present embodiment will be described based on FIG. 6. FIG. 6 is a flowchart of the process in the present embodiment. The process shown in FIG. 6 is mainly performed in the CPU 13. First, the user selects a range of the motion picture in step S10. At that time, the user sets the In point and the Out point as described above in order to set the range of the motion picture.

Next, the CPU 13 obtains the data size of the selected range in step S12. In this case, the CPU 13 locates the sample position of each sample data included between the specified In point and Out point, and obtains the size of the sample data. For example, it is assumed that the whole of the motion picture file has a size of 100 megabyte (MB), and the In point is the 10th sample from the start and the Out point is 15th sample from the start. The data sizes of all samples from the 10th sample to the 15th sample are obtained. For example, the data sizes of the samples from the 10th sample are recognized as 10 MB, 4 MB, 2 MB, 1 MB, and 5 MB, respectively. At that time, each of the thumbnail images relates to each of the sample positions. For example, using an MP4 file format that is often used by smartphones, the data size is obtained from file format information in units of the video/audio in the motion picture to be played back at a time.

Next, in step S14, all of the data sizes included in the selected range are add together to calculate the size of the motion picture file. In the above-mentioned example, the size of the motion picture file is 22 MB because of 10+4+2+1+5 (the Out point is not included)=22 MB.

Next, the time information of the In point and the Out point is obtained in step S16. In this case, the times corresponding to the binary positions of the In point and the Out point are obtained. The start point of the whole of the motion picture file is set as zero and the time information is recorded frame by frame so that the time information of the In point and the Out point is obtained from the time recorded frame by frame. Next, in step S18, the start point is subtracted from the end point of the time information (the end point−the start point) to calculate the duration of the motion picture file.

Figures 7, 8:
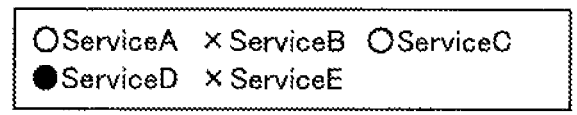
FIG. 7 is a schematic view of criteria information.
FIG. 8 is a schematic view of another exemplary display of an OK determination and an NG determination.

Next, the criteria information for the size and the duration of the motion picture file is obtained in step S20. The criteria information is values predetermined at each network service. FIG. 7 is a schematic view of the criteria information. As shown in FIG. 7, the criteria information is determined by the maximum duration (limit time) and the maximum data capacity (limit capacity) of each of the services. Next, the size of the motion picture file is compared with the size of the criteria information in step S22 to determine whether the size of the motion picture file is equal to or less than the size of the criteria information. When the size of the motion picture file is equal to or less than the size of the criteria information in step S22, the process then goes to step S24. On the other hand, when the size of the motion picture file is larger than the size of the criteria information in step S22, the process then goes to step S28.

The duration of the motion picture file is compared with the duration of the criteria information in step S24 to determine whether the duration of the motion picture file is equal to or less than the duration of the criteria information. When the duration of the motion picture file is equal to or less than the duration of the criteria information in step S24, the process then goes to step S26. On the other hand, when the duration of the motion picture file is larger than the duration of the criteria information in step S24, the process then goes to step S28.

When both of the size and the duration of the motion picture file are equal to or less than the criteria information, the process goes to step S26 and an OK determination is displayed. Thus, "open circles" are displayed at the services A, C, and E as the determination result as shown in FIG. 5.

On the other hand, when at least one of the size and the duration of the motion picture file is larger than the criteria information, the process goes to step S28 and an NG determination is displayed. Thus, "filled circles" are displayed at the services B and D as the determination result as shown in FIG. 5.

The determinations in steps S22 and S24 in FIG. 6 are conducted at each service (for example, "YouTube", "Facebook", and "Gmail"). Accordingly, the OK determination or the NG determination for each of the services can be displayed. Note that although, in FIG. 6, the determination is OK in the case where both of the size and the duration are equal to or less than the criteria information, the determination can also be OK in the case where at least one of the size and the duration is equal to or less than the criteria information. Furthermore, when the criteria information for the size and the duration is not set, or the determination by the criteria information is invalidated; the comparisons in steps S22 and S24 can be skipped, or the determination can typically be OK assuming the criteria information as infinite.

FIG. 8 is a schematic view of another exemplary display of an OK determination and an NG determination, and shows another exemplary display of the service availability display region 29. In the example shown in FIG. 8, "○" or "×" is displayed for indicating whether the user logs in each of the services. In the example shown in FIG. 8, the "×" indicates that the user does not log in the services B and E. An icon other than the open circle and the filled circle is displayed for indicating that the motion picture cannot be uploaded regardless of the size or the duration of the motion picture.

[5. Setting for Criteria Information]

Next, the setting for the criteria information will be described based on FIGS. 9 and 10. FIG. 9 is a schematic view of the screen for registering service names that are displayed on a service availability display region 29 and the criteria information for the service availability. In the example shown in FIG. 9, the "service A" is registered together with its maximum file size of 2048 MB and its maximum duration of 900 sec. The "service B" is also registered together with its maximum file size of 100 MB and its maximum duration of 120 sec. In the same manner, the services C and D are registered together with their maximum file sizes and their maximum durations having predetermined values. Thus, when the specified size and duration of the motion picture file exceed the criteria information determined at the screen, the above-mentioned icon indicating an NG determination is displayed.

The check mark "✓" is displayed at the right side of each of the services shown in FIG. 9, and indicates that the determination of the service is valid. The user can put the check mark "✓" or take off check mark "✓" with touch controls. In the example shown in FIG. 9, the check marks are put on the services A to C to indicate that the determinations of the services A to C are valid. On the other hand, the check mark is not put on the service D to indicate that the determination of the service D is invalid. In this case, the service availability display region 29 displays the services A to C only. The service D is not displayed. Accordingly, the user can selectively recognize the determination result of the desired service only by properly changing the setting of the check mark. Alternatively, the user can set the determination of the service as invalid by registering its maximum file size or the maximum duration as "zero".

FIG. 10 is a schematic view of the screen for changing the registration of the criteria information. When the section of the "service A" in FIG. 9 is touched, the screen shown in FIG. 10 is displayed. The user can change the maximum file size in the criteria information of the service A by touching the Max Size frame on the screen shown in FIG. 10 and inputting a value to the frame. The user can also change the maximum duration in the criteria information of the service A by touching the Max Duration frame on the screen shown in FIG. 10 and inputting a value to the frame.

The maximum size and the maximum duration are often predetermined at each service so that a predetermined value can be set as a default value for the maximum size and the maximum duration. Although the maximum size and the maximum duration are sometimes changed depending on the service provider's convenience, the maximum size and the maximum duration can be suitably updated at the information processing apparatus side by the screen shown in FIG. 10. Alternatively, using a software update in the information processing apparatus, the maximum size and the maximum duration of each of the services can be changed without involving the user.

[6. Exemplary MP4 File Format]

Figure 11:
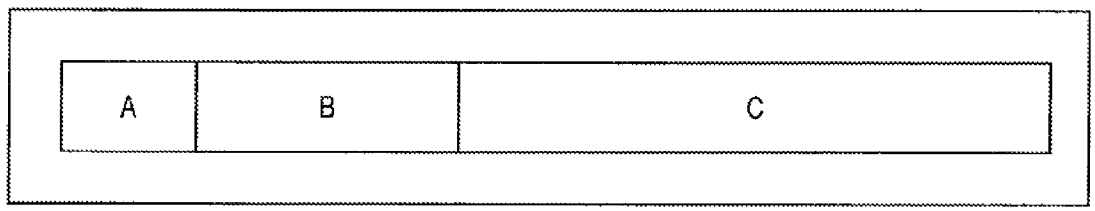
FIG. 11 is a schematic view of a box structure of an MP4 file format.
Figure 12:
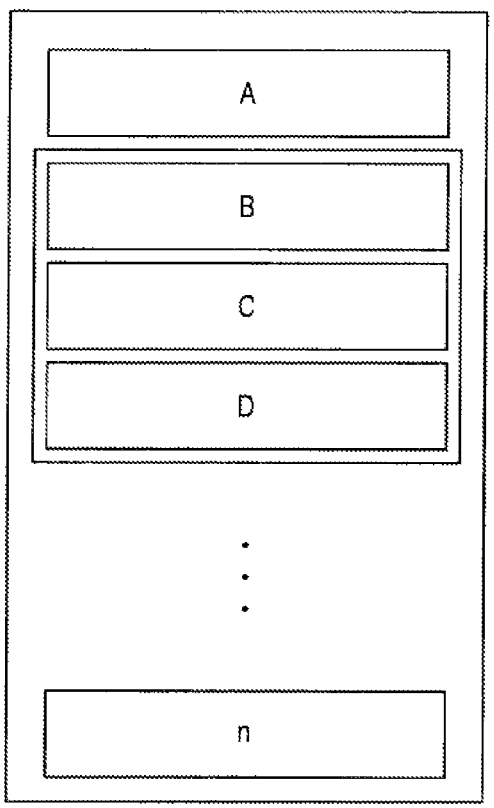
FIG. 12 is a schematic view of the whole structure of the MP4 file format.
Figure 13:
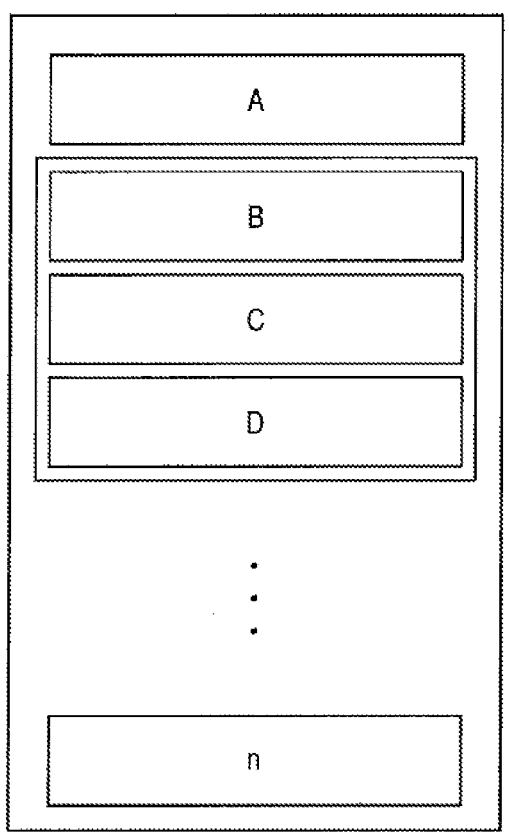
FIG. 13 is a view for explaining that specifying a range to be selected in a motion picture file determines a box structure to be targeted.

Next, an MP4 file format is taken as an example to describe a concrete example when the motion picture file is clipped with the above-mentioned setting of the start point and the end point. FIGS. 11 to 13 are schematic views of a general box structure of an MP4 file format. FIG. 11 is a schematic view of the box structure of the MP4 file format. A box structure is divided into regions A, B, and C as shown in FIG. 11. The region A is for indicating the whole size of the regions A+B+C. The region B includes the name of the box structure. The region C is the data body of the box structure.

FIG. 12 is a schematic view of the whole structure of the MP4 file format. One box structure shown in FIG. 11 corresponds to each of the A, B, C, . . . shown in FIG. 12. The A, B, C, . . . shown in FIG. 12 can correspond to, for example, the thumbnail images A, B, C, . . . . Furthermore, as shown in FIG. 12, a box structure X can be configured to include a plurality of box structures B, C, and D. The above-mentioned "change operation of the set frame interval" changes the number of the box structures A, B, C, . . . included in the box structure X. The first box structure of the box structures included in the box structure X is displayed as a thumbnail image.

For example, when the "change operation of the set frame interval" sets the minimum interval of the thumbnail images, the box structure X includes one thumbnail image. When the interval of the thumbnail images is doubled, a first box structure X includes the thumbnail images A and B, a second box structure X includes the thumbnail images C and D, and a third box structure X includes the thumbnail images E and F. The number of the thumbnail images included in the box structure X is changed. In this case, the first thumbnail images A, C, E, G, . . . of each of the box structures X are displayed in the thumbnail display region 23.

FIG. 13 is a view for explaining that specifying a range to be selected in the motion picture file in FIG. 12 determines a box structure to be targeted. In the example shown in FIG. 13, specifying the In point and the Out point locates the box structure, and the thumbnail images B to D are made the selected range.

Figure 14:
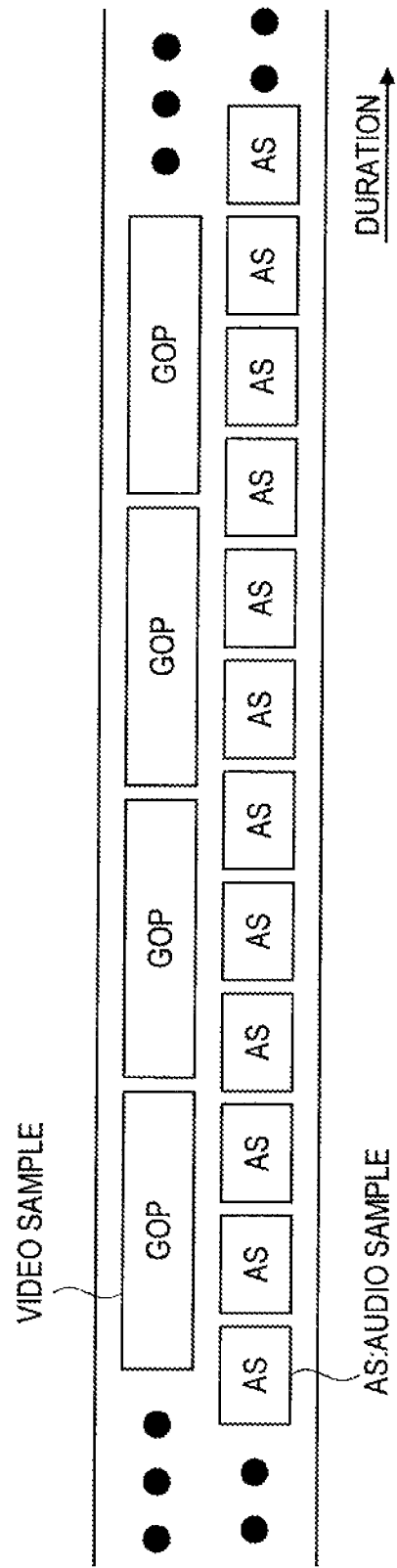
FIG. 14 is a schematic view of the structure of a general motion picture file in MP4 file format.

FIG. 14 is a schematic view of the structure of a general motion picture file in an MP4 file format. Each GOP and each audio sample of a motion picture file are aligned in a time axis direction in FIG. 14.

Figure 15:
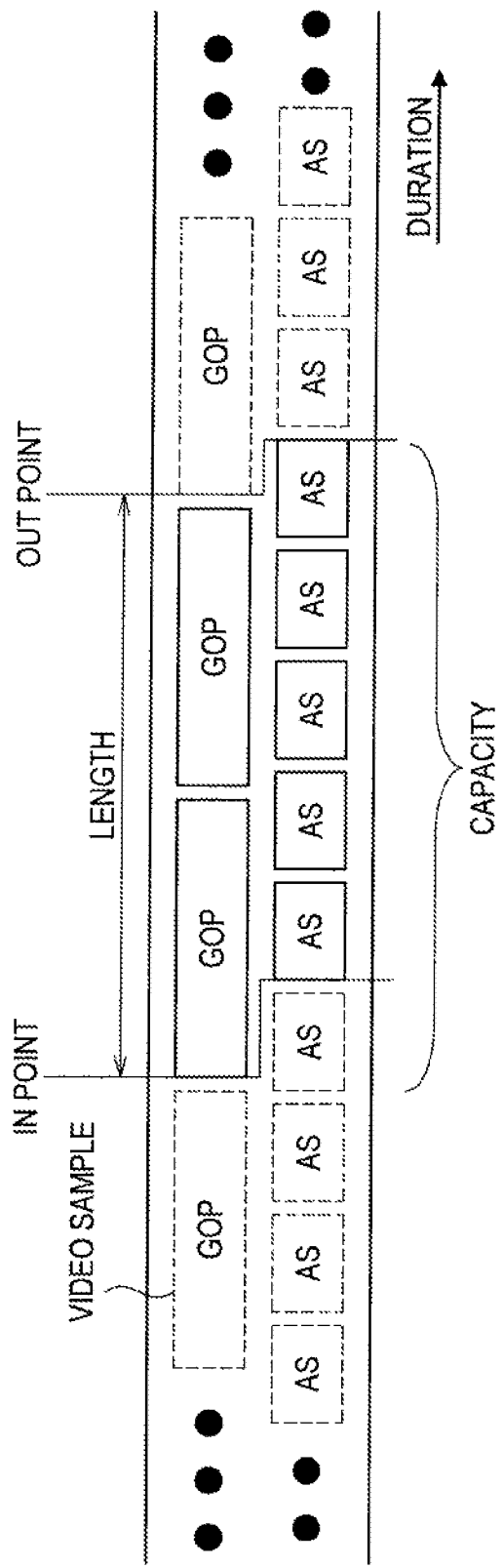
FIG. 15 is a schematic view when an In point and an Out point are specified for cutting and editing the motion picture file.

FIG. 15 is a schematic view when an In point and an Out point are specified for cutting and editing the motion picture file. As shown in FIG. 15, a segment of the motion picture file is specified with the In point and the Out point and then two GOPs are clipped. Five audio samples AS temporally correspond to the two GOPs specified with the In point and the Out point, and are also clipped. In this case, a thumbnail image has been specified as the In point or the Out point in the box structure described in FIGS. 11 to 13. The interval of the box structures is set to cause the thumbnail image to correspond to the first frame of one GOP shown in FIGS. 14 and 15. Accordingly, specifying the In point or the Out point can clip a video sample in units of GOPs as shown in FIG. 15.

In this manner, the motion picture file is clipped in units of GOPs in the present embodiment. Thus, it is not necessary to re-encode the clipped motion picture file. The clipped motion picture file can be uploaded on each of the services or transmitted via an e-mail without any change. This drastically simplifies the process in the CPU 13, and prevents the re-encode from changing the calculation result of the size and the duration of the motion picture file specified with the In point and the Out point. For example, when the information processing apparatus 100 is a portable device such as a smartphone, the specification of the hardware is inferior to a personal computer (PC). This increases the time to re-encode and the battery consumption. In the present embodiment, the re-encode is not performed. This saves time and the battery. Furthermore, the re-encode changes the calculation result of the size and the duration of the motion picture file specified with the In point and the Out point. However, when the re-encode is not performed, it is possible to certainly avoid the situation where the re-encode changes the initial calculation result indicating "transmission OK" to "transmission NG".

Figure 16:
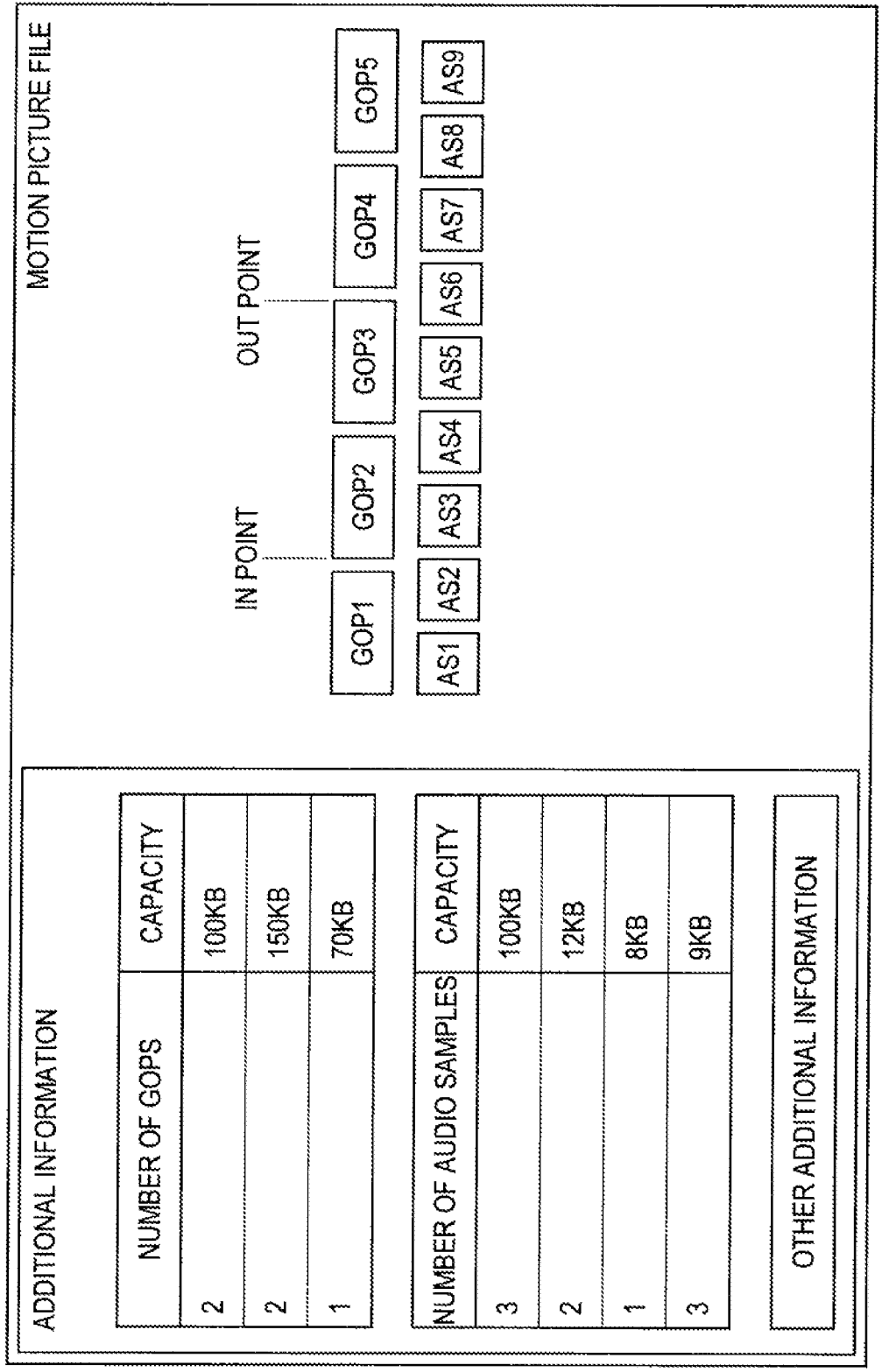
FIG. 16 is a schematic view of the MP4 file.

FIG. 16 is a schematic view of the MP4 file. In the example shown in FIG. 16, it is indicated that, for example, there are two GOPs having 100 KB in a row from the head, subsequently two GOPs having 150 KB in a row, and subsequently a GOP having 70 KB. The additional information also indicates the number and the size of the GOPs from the head, and the number of the audio samples AS from the head and the size of each of the audio samples. In other words, the additional information indicates that the GOPs 1 and 2 have 100 kilobytes (kB), the GOPs 3 and 4 have 150 kilobytes (kB), and the GOP 5 has 70 kilobytes. The additional information also indicates that the audio samples AS1 to AS3 have 100 kilobytes (kB), the audio samples AS4 to AS5 have 12 kilobytes (kB), the audio sample AS6 has 8 kilobytes, and the audio samples AS7 to AS9 have 9 kilobytes (kB).

Figure 17:
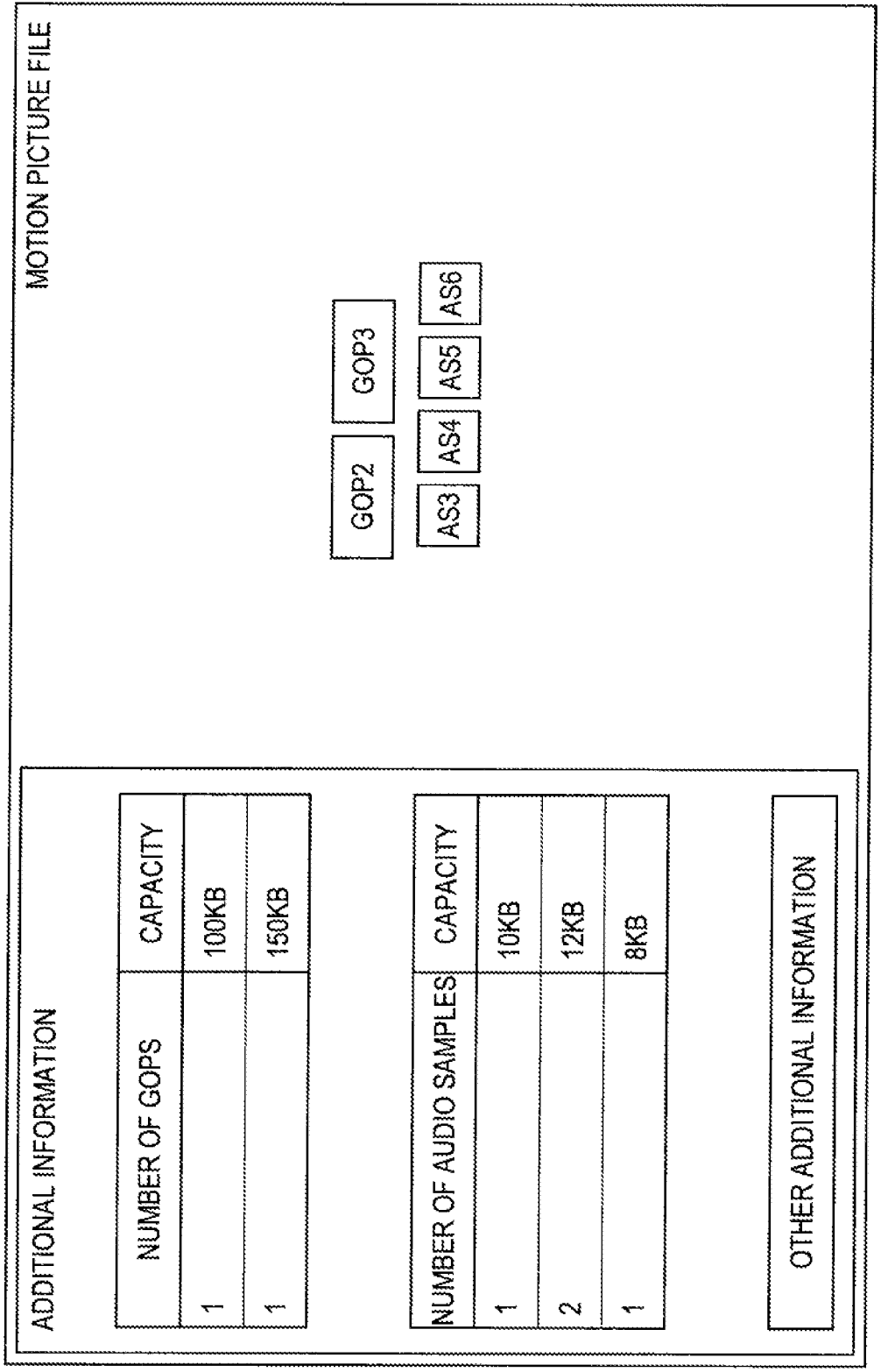
FIG. 17 is a view of the structure of the MP4 file after the MP4 file has been cut and edited.

FIG. 17 is a view of the structure of the MP4 file after the MP4 file has been cut and edited. As shown in FIG. 17, the segment of the motion picture file is specified with the In point and the Out point and then the GOPs 2 and 3 is clipped. The audio samples AS3 to AS6 corresponding to the positions of the GOPs 2 and 3 are also clipped. As shown in FIG. 16, the additional information specifies the capacity of each GOP and each audio sample AS so that the CPU 13 can calculate the capacity of the specified motion picture file. The CPU 13 also obtains the times corresponding to the coordinates of the In point and the Out point, and can calculate the length of the motion picture file (duration).

As shown in FIG. 17, for example, it is assumed that the GOPs 2 and 3 and the audio samples AS3 to AS6 are cut and edited. If only the capacities of the GOPs 2 and 3 and the audio samples AS3 to AS6 are considered regardless of the capacity of the additional information, the capacities are regarded as lower than the capacity of the final output file. In light of the foregoing, the capacities of the GOPs and the audio samples AS together with the capacity of the additional information are considered. The sizes of the GOPs and the audio samples AS are changed according to the range to be cut. It is determined according to the whole of the capacities whether upload is possible or not.

FIG. 18 is a schematic view of another reference chart of the set values of each service described in FIG. 8. In the example shown in FIG. 18, the format and the bit rate to be used for each upload destination are shown. Accordingly, the motion picture file can be changed according to the format and bit rate specified at each of the services.

It should be understood by those skilled in the art that various modifications, combinations, sub-combinations and alterations may occur depending on design requirements and other factors insofar as they are within the scope of the appended claims or the equivalents thereof.

Additionally, the following configurations are also within the technical scope of the present disclosure.

(1) An information processing apparatus including:
a storage part for storing criteria information of a plurality of destinations; and
a display control part for performing control to display transmission capability information indicating whether it is possible to transmit, to each of the destinations, a selected motion picture file in a predetermined range selected from a motion picture file by a user, the transmission capability information being derived based on information about the selected motion picture file and the criteria information.

(2) The information processing apparatus according to (1), further including:
a motion picture generating part for generating the selected motion picture file by clipping the predetermined range selected from the motion picture file by the user,
wherein the display control part performs control to display a menu for clipping the selected motion picture file from the motion picture file together with the transmission capability information.

(3) The information processing apparatus according to (2), further including:
a transmitting part for transmitting the selected motion picture file generated by the motion picture generating part,
wherein the transmitting part transmits the selected motion picture file generated by the motion picture generating part without re-encode.

(4) The information processing apparatus according to (1), wherein the display control part performs control to further display a screen for setting the criteria information.

(5) The information processing apparatus according to (1), wherein the criteria information is set based on a maximum acceptable capacity or a maximum acceptable duration.

(6) A display method including:
storing criteria information of a plurality of destinations; and
performing control to display transmission capability information indicating whether it is possible to transmit, to each of the destinations, a selected motion picture file in a predetermined range selected from a motion picture file by a user, the transmission capability information being derived based on information about the selected motion picture file and the criteria information.

What is claimed is:

1. A display method comprising:
storing criteria information of a plurality of destinations;
selecting a motion picture file; and
performing control to display transmission capability information indicating whether it is possible to transmit, to each of the destinations, the selected motion picture file, the transmission capability information being derived based on information about the selected motion picture file and the criteria information,
wherein the selecting of the motion picture file includes setting a desired start point and a desired end point of a motion picture file by a user so as to enable the user to select a desired portion of the motion picture file which is less than the entire motion picture file, and
wherein a position and a range of the selected motion picture file as compared to the entire motion picture file is displayed with the transmission capability information, so as to provide the user with both (i) a visual indication as to where the selected motion picture file is located relative to the entire motion picture file and a size thereof, and (ii) a respective visual indication as to whether the selected motion picture file is transmittable to each of the destinations.

2. An information processing apparatus comprising:
a memory that stores criteria information of a plurality of destinations; and
a processor that enables a motion picture file to be selected and that controls display of transmission capability information indicating whether it is possible to transmit, to each of the destinations, the selected motion picture file, the transmission capability information being derived based on information about the selected motion picture file and the criteria information,
wherein the selecting of the motion picture file includes setting a desired start point and a desired end point of a motion picture file by a user so as to enable the user to select a desired portion of the motion picture file which is less than the entire motion picture file, and
wherein a position and a range of the selected motion picture file as compared to the entire motion picture file is displayed with the transmission capability information, so as to provide the user with both (i) a visual indication as to where the selected motion picture file is located relative to the entire motion picture file and a size thereof, and (ii) a respective visual indication as to whether the selected motion picture file is transmittable to each of the destinations.

3. The information processing apparatus according to claim 2, wherein the processor controls transmitting the selected motion picture file without re-encode.

4. The information processing apparatus according to claim 2, wherein the processor controls displaying a screen for setting the criteria information.

5. The information processing apparatus according to claim 2, wherein the criteria information is set based on a maximum acceptable capacity or a maximum acceptable duration.

* * * * *